US009830493B2

(12) United States Patent
Bechtel

(10) Patent No.: US 9,830,493 B2
(45) Date of Patent: Nov. 28, 2017

(54) FINGER GUIDE DEVICE WITH CAPACITIVE SENSOR

(71) Applicant: PEN-ONE ACQUISITION GROUP, LLC, Mobile, AL (US)

(72) Inventor: J. Scott Bechtel, Lafayette, IN (US)

(73) Assignee: Pen-One Acquisition Group, LLC, Mobile, AL (US)

( * ) Notice: Subject to any disclaimer, the term of this patent is extended or adjusted under 35 U.S.C. 154(b) by 43 days.

(21) Appl. No.: 14/922,814

(22) Filed: Oct. 26, 2015

(65) Prior Publication Data

US 2016/0188947 A1  Jun. 30, 2016

Related U.S. Application Data

(60) Division of application No. 13/430,330, filed on Mar. 26, 2012, which is a continuation of application No. 11/267,365, filed on Nov. 3, 2005, now abandoned.

(60) Provisional application No. 60/624,303, filed on Nov. 3, 2004.

(51) Int. Cl.
*G06K 9/00* (2006.01)
*G06F 21/32* (2013.01)

(52) U.S. Cl.
CPC ........ *G06K 9/0002* (2013.01); *G06F 21/32* (2013.01); *G06K 9/00013* (2013.01); *G06K 9/00073* (2013.01); *G06K 9/00093* (2013.01); *G06K 9/00919* (2013.01)

(58) Field of Classification Search
CPC .............................. G06K 9/0002; G06F 21/32
USPC ................................................. 382/124, 126
See application file for complete search history.

(56) References Cited

U.S. PATENT DOCUMENTS

| 3,955,179 A | 5/1976 | Planke ................... 340/146.3 H |
| 4,385,831 A | 5/1983 | Ruell .............................. 356/71 |
| 5,177,802 A | 1/1993 | Fujimoto et al. ................. 382/4 |
| 5,229,764 A | 7/1993 | Matchett et al. ........ 340/825.34 |
| 5,412,463 A | 5/1995 | Sibbald et al. ................. 356/71 |
| 5,818,956 A | 10/1998 | Tuli ............................. 382/126 |
| 5,963,679 A | 10/1999 | Setlak .......................... 382/312 |

(Continued)

FOREIGN PATENT DOCUMENTS

| DE | 198 20 026 | 9/1999 |
| EP | 1197911 | 4/2002 |

(Continued)

*Primary Examiner* — John Strege
(74) *Attorney, Agent, or Firm* — Devlin Law Firm LLC

(57) ABSTRACT

A finger guide device that positions a finger (or minutiae containing digit) of a human subject on a fingerprint sensor in a manner optimal for the data capture operation of authentication of identification of said subject, wherein a relevant portion of the finger is in alignment with a sensor or scanner. The finger guide device may also be used for enrollment of the initial fingerprint data into the system. The device may contain an outer surface ridge which feels somewhat uncomfortable due to application of a high pressure per square inch on small areas of the finger when the finger is incorrectly positioned to encourage correct placement of the finger. The finger guide device may have a curved inside surface to contour to a wide variety of fingertip shapes and sizes, wherein the sides and front have shorter radii of curvature than the rearward portion of the finger guide device.

4 Claims, 5 Drawing Sheets

(56) References Cited

U.S. PATENT DOCUMENTS

| | | | | |
|---|---|---|---|---|
| 6,049,620 A | * | 4/2000 | Dickinson | G01B 7/004 |
| | | | | 382/108 |
| 6,148,094 A | | 11/2000 | Kinsella | 382/124 |
| 6,208,264 B1 | | 3/2001 | Bradney | 340/5.2 |
| 6,289,114 B1 | | 9/2001 | Mainguet | 382/124 |
| 6,333,989 B1 | | 12/2001 | Borza | 382/124 |
| 6,373,969 B1 | | 4/2002 | Adler | 382/127 |
| 6,454,437 B1 | * | 9/2002 | Kelly | G01J 3/10 |
| | | | | 359/287 |
| 6,539,101 B1 | | 3/2003 | Black | 382/124 |
| 6,937,748 B1 | * | 8/2005 | Schneider | G06K 9/00013 |
| | | | | 382/126 |
| 6,970,584 B2 | | 11/2005 | O'Gorman | 340/5.83 |
| 7,146,029 B2 | | 12/2006 | Manansala | 382/126 |
| 7,184,580 B2 | | 2/2007 | Hamid | 283/69 |
| 7,929,736 B2 | * | 4/2011 | Bechtel | G06F 3/03545 |
| | | | | 340/5.53 |
| 2002/0106115 A1 | | 8/2002 | Rajbenbach et al. | 382/126 |
| 2003/0128192 A1 | | 7/2003 | vanOs | 345/173 |
| 2004/0076314 A1 | | 4/2004 | Cheng | |
| 2004/0101172 A1 | | 5/2004 | Lane | |
| 2004/0124246 A1 | | 7/2004 | Allen et al. | 235/492 |
| 2004/0170307 A1 | | 9/2004 | Manansala | 382/115 |
| 2004/0101171 A1 | | 12/2004 | Zusammenfassung | |
| 2005/0053264 A1 | | 3/2005 | Amano et al. | 382/115 |
| 2006/0093292 A1 | | 5/2006 | Bechtel | 382/126 |

FOREIGN PATENT DOCUMENTS

| | | |
|---|---|---|
| EP | 1286298 | 2/2003 |
| EP | 1812890 | 8/2007 |
| JP | 2-12381 | 1/1990 |
| JP | 3-1456691 | 6/1991 |
| JP | 3226888 | 10/1991 |
| JP | 10-269344 | 10/1998 |
| JP | 2001-143056 | 5/2001 |
| JP | 2001266108 | 9/2001 |
| JP | 2002-044727 | 2/2002 |
| JP | 10-20040045908 | 6/2002 |
| JP | 2003-58872 | 2/2003 |
| KR | 1020010110390 | 12/2001 |
| WO | WO 00/39743 | 7/2000 |
| WO | WO 01/22349 | 3/2001 |

* cited by examiner

Computer Display

FINGER GUIDE DEVICE WITH CAPACITIVE SENSOR

CROSS-REFERENCE TO RELATED APPLICATIONS

This application is a divisional of application Ser. No. 13/430,330 filed Mar. 26, 2012, which is a continuation of application Ser. No. 11/267,365 filed Nov. 3, 2005, which claims priority to U.S. Provisional Application #60/624,303 filed Nov. 3, 2004.

FIELD OF THE INVENTION

The invention relates generally to a finger guide called a finger guide device used to position a finger, thumb or human digit containing unique minutiae upon a scanner or sensor or other means to capture an image of the miniature features of a relevant portion of the said minutiae or underlying tissue, which is equivalently called a fingerprint. This finger guide device would be used with electronic, optical, electromagnetic, capacitive, electroluminescent, or similar scanners or sensors requiring repeated and reasonably accurate positioning in alignment with the scanner or sensor. Applications include the accurate identification of an individual with a minimal number of false rejects or repeats of the process for scanning or reading the enrolled portions of the fingerprint.

BACKGROUND OF THE INVENTION

U.S. Patent Application No. 2004101172 (Lane) discloses a finger imaging system for receiving the finger of a person being fingerprinted by an automated fingerprint reader. The system includes a finger imaging device having a finger receiving portion for receiving the finger to be fingerprinted. Extending outward from the finger receiving surface is a locator bar that engages a crease of the subject finger when it is in about in the desired position. U.S. Patent Application 2004101171 (Lane et al.) discloses a finger imaging system for receiving and holding a finger of a person being fingerprinted by an automated fingerprint reader. The system includes a finger imaging device having a finger receiving portion and a finger positioning portion, together forming a recess of reducing dimension such that a subject finger forcibly inserted into it is held in a stable position. And finally, U.S. Patent Application No. US2004076314 (Cheng) discloses an apparatus that includes a fingerprint sensor and a guiding means. The sensing site of the fingerprint sensor makes a relative and obtuse angle with a guiding plane of the guiding means. Traditionally, in order to record a fingerprint, ink was applied to a finger and then the finger was "rolled" across a paper or other ink receptive surface to print an image of the fingerprint. Fingerprints left by touching a surface and leaving oil residue are captured forensically by a variety of process techniques that "lift" and reveal the fingerprint.

In more recent years, alternative technologies have been developed that can reveal the fine features within a fingerprint and capture the fingerprint directly from the finger. Electronic sensing technology involves holding the finger on a sensing system as the system detects skin or living tissue differences across the finger area or just a relevant portion of the finger area in order to reveal an image of the fingerprint or in order to create an electronic representation of the fingerprint, for example as a digital file. Examples include but are not limited to optical scanners, electroluminescent pressure sensitive systems, integrated circuits with the ability to measure individual pixel sized capacitance, and more.

The production cost for some types of fingerprint scanning systems is driven by the size of the fingerprint area to be sensed. This is especially true for silicon based or integrated circuit (IC) type sensors. Like most IC's, the larger the IC, the more costly it is to produce assuming equal device geometries and layer count. The production cost of the sensor is directly related to the sensing area, and mass production of sensors the size of a thumb is not optimal when only a relevant portion of a fingerprint needs to be scanned in order to build a fingerprint authentication system. If just a portion of the fingerprint is to be used in order to reduce system cost, then it becomes important to place substantially the same relevant portion of the finger that was originally enrolled upon the sensor for every authentication or identification event.

Clearly a smaller sensor would cost less and, assuming the area of the fingerprint sensed is still necessarily large enough to provide an acceptable matching capability or security level, then the optimal solution would be this smaller sensor, leaving out unneeded portions of the total fingerprint area. The finger guide device invention is a device which may be used to reliably reposition a finger upon a small sensor to enable more efficient identification. The device reduces false rejects caused by failure to position the finger close enough to its original enrollment position or positions so that the sensor can read a matching relevant portion of the fingerprint. The finger guide device reduces the incidence of false rejects by naturally, intuitively, and non-forcibly guiding the subject finger to approximately the same and original enrollment position each time the fingerprint identification system is used. When smaller sensors are used, if the finger is enrolled in a manner that scans one relevant area of the finger, or perhaps several overlapping relevant portions of the fingerprint which are then electronically assembled by a computer into a completed "template" representing a larger area of the original subject's fingerprint than any single scan could produce alone, then the system depends upon a subject person or user being able to touch the sensor consistently in the same approximate place so that a relevant portion of the fingerprint is read by the sensor so that matching and therefore authentication or identification may take place. Failure to replace the finger accurately onto the fingerprint sensor or scanner causes false rejects; or, in other words, because the sensor sees a different area of the fingerprint it cannot match with the previously enrolled area or portions of the fingerprint, it rejects a known subject as not matching. This is a false reject. If the system permits additional attempts, and if the second or subsequent try finally aligns the minutiae containing a relevant potion of the fingerprint originally stored during enrollment with the scanner or sensor, the known subject will then be accepted (identified or "authenticated"). The finger guide reduces the average number of attempts to authenticate known subjects by providing a simple, funnel like or inverted pyramid like guide for the finger that physically but non-forcibly encourages the finger into the correct position so that a relevant portion of the finger is in alignment with the sensor or scanner and provides a variety of tactile and other feedback means for the subject user in order to make it easier to "find" the right position again, even after substantial time has passed between enrollment and the next authentication event. If the finger is in the correct position, but the touch pressure is too hard or too light, the scanner or sensor may capture a distorted image and this may also cause a false reject. The finger guide device also assists users in learning and repeating the correct touch pressure using a variety of feedback means including but not limited to tactile feedback, mechanical motion feedback, audio or visual feedback, the field of possible feedback means being known to those skilled in the art of human factors engineering. In contrast with basic flat surface sensors or even poorly designed sensors, the described false reject rate for untrained subjects can range from ten to twenty percent of all subjects. Systems using the finger guide device will experience less than ten percent false rejects and fingerprint authentication systems using the finger guide device may be optimized for even lower rates of false rejects.

SUMMARY OF THE INVENTION

Much like a round or rectangular funnel guides a fluid into a container; the finger guide device includes a finger recess which acts to guide the finger towards the same position on the sensor in a repeatable manner. Another simple analogy is to describe a ball on the point of a pyramid, which is unstable versus a ball in an inverted pyramid, wherein the ball always rolls to the same global minimum and position through the natural force of gravity and guiding effect of the sidewalls of the inverted pyramid recess. In the case of the finger guide device, analogous action is initiated by muscles applying force to move the finger into the finger guide device recess and towards the sensor area, such movement being guided by disclosed and described physical shape recess elements in the finger guide device invention. The guiding effect of the mechanical recess and overall performance of the finger guide device may be further enhanced through tactile or other feedback communication to the subject, such as feedback caused by tactile properties of the finger guide material or surfaces, additional physical shape elements intended to cause tactile feedback, mechanical movement, or other visual or audio feedback means. The sensor would sit in alignment with the finger guide device in correct position and adjacent to the desired area of the finger in order to "see" a relevant portion (projection) of the fingerprint.

Previous devices to locate fingers for fingerprint imaging focused upon the need to hold (literally press and flatten) the finger against a flat scanning surface and tended to either locate the finger crudely from the front edge of the nail or the skin crease under the first joint in the finger. The intent was to substitute for the effect of rolling a print and pressure to flatten the finger was an important element. Modern semiconductor sensors require only a light touch and, as noted, often focus on repeating the scan or capture of the same relevant portion of the fingerprint over and over again. What is needed is a device that reduces the average number of attempts to authenticate known subjects by providing a simple circular, oval, rectangular, or square funnel like recess or guide for the finger that physically encourages the finger into the correct position opposite a scanner or sensor and may be further improved by providing a variety of tactile, mechanical movement, audio, or visual feedback means for the subject user in order to make it easier and more natural to "find" the right finger position again, even after substantial time has passed between enrollment and the next authentication attempt. In contrast, with basic flat surface sensors or even poorly designed sensors, this false reject rate for untrained subjects can range from ten to fifteen percent of all attempts. The finger guide device of the present invention provides an effective aid in positioning the finger in essentially the same position on a repeatable basis and a learning mechanism that assists subject users in developing the right position and touch (pressure) as well through a set of basic design and construction elements including physical shape, material properties, and surface finish properties. Additional feedback means may also be used to aid in the effectiveness of the finger guide device.

In practice, the preferred embodiment of the finger guide device invention is designed to relocate a relevant portion of the finger between 0.20 and 0.90 inch in distance from the underside of the fingernail in alignment with a sensor or scanner, and, as such, locates from the finger tip rather than the ridge under the first joint in the finger. In addition, the finger guide device top edge at the front is of a tow enough profile to avoid contact with the fingernail. Such contact would introduce error because subjects trim their nails to different lengths and most would also find pressure against the nail tip uncomfortable, both conditions having been found in previous devices claimed to help position a finger upon a fingerprint reader or scanner.

The physical design of the finger guide device enables sufficiently accurate placement of the finger over the sensor to facilitate a substantial increase in the percentage of first time acceptance (of enrolled subjects), said result being equivalent to reducing the percentage of false rejects. This preferred embodiment includes a relatively short concave radius (or relatively steep slope) at the front of the finger guide device where the finger tip just below the finger nail touches or is proximal to the front of the finger guide device and a longer radius concave shape (or less steep slope) adjacent to the opposite side of the sensor where the guide extends up the finger towards the body. The portions of the sides opposite the scanner or sensor are quite steep to keep the finger centered laterally. Overall, the finger guide device is sized for an average finger, yet accommodates a wide range of digit sizes because it only interfaces with a small curved portion of the finger or digit, said portion to include a relevant portion of the finger.

The tolerance allowed for finger placement on smaller electronic sensors mounted on flat surfaces is fairly liberal, yet positioning the finger on these devices remains challenging for untrained subjects. This relevant portion of the fingerprint might be limited to approximately half to two thirds of the fingerprint area that will be scanned as necessarily overlapping with relevant portions of the fingerprint previously scanned (enrolled) and existing in the matching template, depending on the algorithm used and accuracy of the system. Low accuracy systems may operate with even less than half a sensor window overlap. The actual relevant portion required for a security match depends upon the algorithm and, within the algorithm, the actual desired security level or security setting. This is related to the relevant portion of the scanned subject print that correlates with the subject's enrolled template.

The ability to place generally the same portion of the print opposite and aligned with the active area (window) of the sensor on a consistent and repeatable basis helps facilitates rapid and accurate matching and reduces the false reject rate substantially. The finger guide device invention reduces false rejects among enrolled, but unpracticed subjects to less than ten percent. Practice using the finger guide device or system optimization or both will further reduce the false reject rate.

This reduction in false reject rates from an average of about 15 percent to less than ten percent makes a significant difference in security system acceptance and marketability. Frustration within the user population is substantially reduced if people do not need to touch the sensor multiple times to be accepted. In late 2003 a new keyboard was introduced to approximately 250,000 users and had no effective finger guide solution. There was considerable frustration in the user base and the company that deployed the system faced considerable criticism. Such problems cause users to question how well a system works, even though the problem may be technically termed user error or the fault of the user because of inaccurate finger placement during the authentication process. The finger guide device reduces this expected user error and increases the likelihood of subject user acceptance on the first touch. This saves a great deal of time over the life of a system and is a critical element to developing biometric systems that are competitive with passwords or PINs in terms of user time and efficiency.

Using the finger guide device of the present invention for both enrollment and authentication enhances the efficacy of the finger guide device in actual practice and application. This is because the natural feel of the finger guide device non-forcibly and ergonomically guides users to approximately the same position or alignment of a relevant portion of the finger with the active sensor area each time. This guiding process is both physical and neural, providing tactile feedback that is important to first use and subsequent learning. During enrollment, the system may ask the subject to touch and remove the finger several times. The finger guide device is generally designed to accommodate fingers, thumbs, or any digits from left or right appendages. This means that it aids placement but does not strictly limit placement to an exact and repeatable placement; instead, it simply brings the placement within the tolerance ranges of the sensor and fingerprint template matching algorithm. This allows for the template to extend beyond the strict limits of the ideal or "perfect" window frame (projection) and thus create a template that has guard banding designed in for the purpose of accommodating future misalignment within the tolerance and alignment capability of the finger guide device. This function is important to long term, repeatable performance, and the alignment improvement facilitated by the finger guide device need only rise to the limits required by the matching system, template dimensions, and security level of the algorithm. In fine-tuned (optimized) systems, false rejects among experienced user subjects can be reduced to less than two percent with the assistance of the finger guide device invention.

Some sensors drive an electrical potential into the finger tissue. This may be a radio frequency or RF electromagnetic signal. The finger guide device may be electrically conductive to aid these applications during enrollment and subsequent authentication events. In this case, conductive material property and mechanical design elements of the finger guide device are said to help "illuminate" the subject finger tissue with the necessary RF signal generated by the sensor and passed through or reflected by the finger guide device or its smooth and conductive surface. The generally parabolic elements of one preferred embodiment of the finger guide device invention emit and reflect this electromagnetic radiation into a relevant finger tissue and aid the sensor in image data capture of a relevant portion of the fingerprint. Flat sloping conductive sides will also improve the illumination of a relevant area of a fingerprint.

The mechanical surface properties and material selected for the finger guide device are important to performance. Since the finger must slide easily into position, low coefficient of friction (sliding coefficient or static coefficient or both) is useful to permit the finger to come to rest at its natural local minimum, which is at the bottom of the finger guide device properly positioned in alignment with the scanner or sensor. This surface property and non-forcible guiding process positions the finger in the same proximal location time and time again wherein a relevant portion of the fingerprint is captured in order to reduce false rejects and reduce the need for additional touches to the sensor. Examples of materials with such low coefficient of friction properties include but are not limited to smooth metals, smooth plastics, and even painted, polished, or waxed surfaces. Lubricants may also be used. If the surface material has a high coefficient of friction (for example, rubber, urethane based material, or rough plastic), the utility and function of the finger guide device would be reduced or compromised because the finger would not slide into position as easily.

Other feedback elements may be included in various additional preferred embodiments of the present invention. Humans will develop the ability to feet the right position. The finger guide device may be made of a material with a high thermal conductivity. Examples include but are not limited to metals, metal plated surfaces, certain ceramics, or certain carbon based materials. In this case, the finger guide device would tend to feel cold to the touch at room temperature, not because of its absolute temperature but because it has a thermal conductivity that conducts heat quickly out of the finger when touched. If the finger guide device is made of metal, this property will make it feel like metal to the touch (e.g.—cold feeling). By feeling colder than the rest of the parts and colder than the sensor, the subject will learn the correct "feel" of the finger guide device and will also better feel the sensor in order to determine its location.

Additional bumps may be added to help orient the finger or enable subjects to "fine tune" their finger position. These may be unnecessary for normal or average sized fingers but may be worthwhile in applications where the subjects have very small fingers that contact little of the finger guide's surface area.

Braille may be added to the finger guide device for assisting blind users or users having impaired vision.

The finger guide device may also use physical elements and material properties to discourage improper use. For example, a preferred method of practicing this invention surrounds the finger guide with a relatively hard and distinct ridge. While not felt as dangerously "sharp" this ridge is designed so that it feels uncomfortable to users. When a finger is placed across this ridge, while not harmful, it is not comfortable because it applies a high pressure (PSI) to the skin across a very narrow area. This high pressure per square inch signals through the sense of touch (tactile feedback) that the finger guide device is not being used correctly. The feel of the misaligned finger is said to feel unnatural and the user will instinctively reposition his or her finger for a more natural and comfortable feel in the recess of the finger guide device. The natural tendency is to avoid finger placement against the uncomfortable outer ridge of the finger guide, instead sliding the finger or thumb down into the finger guide and onto the sensor (the desired position). It is in this correct position that the finger or thumb placement feels both natural and secure to the subject user.

Additional embodiments of the invention may include feedback mechanisms including those designed to alert (and train) subjects regarding the correct positioning of their finger or feedback designed to alert subjects to the fact that they have been accepted into the system (which is to say that their fingerprint has been scanned, compared, and correctly matched). Sound may be used to "guide" the finger to the sensor. Visual indicators may also be used. Examples include but are not limited to icons, marking of a fingerprint drawing, fiducial markings, light sources (such as LED's), and colored circles. Finally, physical mechanical movement feedback mechanisms such as vibration or "click" feedback may be applied much like the stick shaker that alerts pilots of a stall warning when flying a plane or the click keys found in keyboards and control panels, all such feedback methods being known to those skilled in the art of human factors engineering and herein are incorporated by reference rather than recited in full detail.

These feedback mechanisms may also be used to correct misuse of the system. For example, extreme pressure on the sensor or a lack of touch pressure can cause scanning problems. Overpressure can flatten minutiae and saturate the sensor and cause inability to resolve minutiae accurately. Conversely, the lack of pressure in the form of too light a touch may cause the minutiae to remain irresolvable by the sensor so that good image cannot be generated. In either case, a voice command or sound or vibration or other feedback means could be used to communicate the need to relax the grip or even to press or squeeze a bit harder. Said feedback means may communicate to the subject the need to lighten up touch pressure or lift the finger a bit. Use of a click feedback means may require that a user apply the minimum acceptable pressure required for the scanner or sensor to "see" a relevant portion of the finger. Another viable approach is to move the sensor up or down slightly in the finger guide sensor window in order to adjust for differences in finger pressure on the scanner or sensor.

A preferred method of practice for this invention is an assembly with the sensor and finger guide designed to work together as one unit, which is to say a system. This requires configuring the sensor for operation on a circuit board, likely containing additional support circuitry for its application. The combination of finger guide, sensor, sealing gasket, and printed wiring board with connector may or may not be placed in its own housing. As such, this subassembly may be placed in a variety of devices for its application. The unit is a security platform with a plurality of uses. Examples include but are not limited to vehicle doors or dashboards, countertops, doors or doorframes, keyboards, personal digital assistants, telephonic devices, secure fax machines, computing devices, appliances, instruments, machinery controls, medical devices, cash registers, and much more.

Fingerprint sensors or scanners use a variety of solutions to sense and capture image data detailing the unique individual features of a human fingerprint minutiae or the living minutiae tissue directly under the fingerprint. In this discussion and throughout this document, the use of the words finger and fingerprint are intended to refer to any digit and its unique minutiae from left or right appendages and to be the same and equivalent to the use of the word thumb or thumbprint. The use of the words he and his are not intended to be gender specific and are intended to be equivalent to she or her.

The finger guide device of the present invention may be used as a device to provide inputs to a system from a user. This embodiment of the present invention would include mechanical communication of the finger guide device to one or more pressure sensors or electrical capacitive sensors to sense when the finger guide device is touched or pressed. When the device is touched it may serve as an input or switch control device and when the device is pressed in one or more directions and with varying pressure or surface contact movement, it may serve as a proportional input device to facilitate a variety of input applications including but not limited to controlling machinery or equipment or as a pointing device for a computer. Placement of a finger in the finger guide device and applying pressure in axial or lateral directions or combined directions will allow a second utility use of the finger guide as a pointing device when the finger guide device is in communication with pressure sensors or switches. Changing or moving the points of touch contact with the sides of the recess will also facilitate utility use of the finger guide device as a pointer or control device if the surface contains sensors to detect the changes, said touch sensor means being known to those skilled in the art of producing touch sensitive pointing and control devices and herein are incorporated by reference rather than recited here in full detail.

A user subject may be under duress during use of the finger guide device of the present invention; for example, a crime might be underway wherein a user might be at gunpoint and forced to authenticate against his will. In such a circumstance, it may be desirable for the user to have a different digit enrolled as an emergency signal that the device user is in danger, said emergency digit not necessarily being known to others. If the user is experiencing another type of emergency, or even forced illegally to use the device, then he may use his "911" digit to call for help. In such a case, the system cannot match the enrolled fingerprint, but it will recognize a match with the user subject's emergency finger and therefore recognize the need to respond differently and accordingly.

For a more complete understanding of the finger guide device of the present invention, reference is made to the following detailed description and accompanying drawings in which the presently preferred embodiments of the invention are shown by way of example. As the invention may be embodied in many forms without departing from the spirit of essential characteristics thereof, it is expressly understood that the drawings are for purposes of illustration and description only, and are not intended as a definition of the limits of the invention. Throughout the description, like reference numbers refer to the same component throughout the several views.

DETAILED DESCRIPTION OF THE PREFERRED EMBODIMENTS

Fingerprint scanners or sensors are used in a variety of applications to capture relevant image data of a fingerprint for comparison with one or more stored fingerprint images or fingerprint templates. Devices that include fingerprint sensors may be designed only for the purpose of capturing a relevant portion of a fingerprint or the fingerprint sensor device may be included as part of a device with other additional purposes, such as a keyboard or a door lock or other device. The finger guide device of the present invention is intended for use in all of these devices and applications where a fingerprint scanner or sensor is desired.

Figure 1:
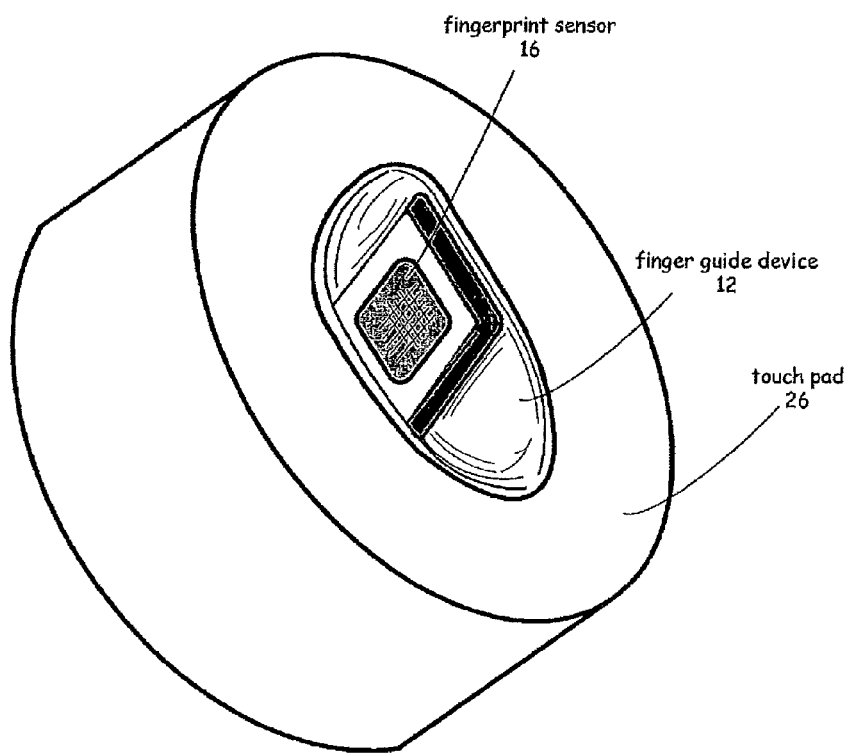
FIG. 1 discloses a preferred embodiment of the finger guide device of the present invention mounted in alignment with a fingerprint sensor and mounted in a commonly used biometric touch pad similar to fingerprint touch pads ordinarily used with computers for the purpose of identifying and authenticating system users.

Referring now to the drawings, in FIG. 1 the preferred embodiment of finger guide device 12 of the present invention is shown in alignment with a fingerprint sensor 16 wherein both the finger guide device and fingerprint sensor reside in a simple touch pad 26 housing to sit on a desk, countertop or other surface. This simple fingerprint pad configuration of the preferred embodiment is normally used with a computer or terminal or payment cash register to identify a subject in order to grant access to data, files, or network communications or to identify the subject for another purpose; for example, completing a payment transaction. The touch pad combined with the computer and fingerprint matching software algorithm is a fingerprint identification system. The finger guide device reduces the number of false rejects experienced during repeated use of the fingerprint identification system.

Figure 2:
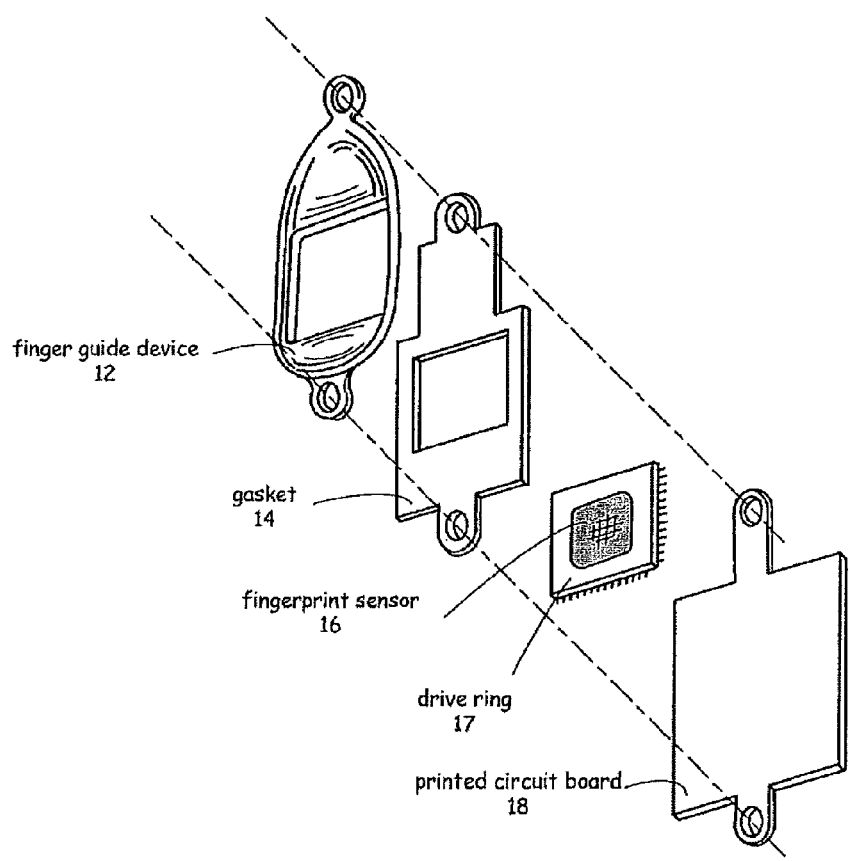
FIG. 2 is an assembly drawing of the preferred embodiment of the finger guide device of the present invention of FIG. 1 comprising the finger guide device, gasket, aligned fingerprint sensor with drive ring, and printed circuit board.

FIG. 2 discloses an inverted assembly drawing of the preferred embodiment of the finger guide device 12 of the present invention comprising the finger guide device 12, gasket 14, sensor 16 and drive ring 17, and printed circuit board 18. The left and right sides of the finger guide device next to the sensor area are steeper than the front (lower portion in FIG. 2) and back (upper portion in FIG. 2) and of a concave nature in this embodiment. The front portion of the finger guide device is concave from the sensor alignment portion to the top ridge and has shape derived from a short set of radii to create its generally concave contour. The fingertip will contact this front portion of the finger guide device (see next FIG. 3B). For certain handheld devices including but not limited to handheld computers (see FIGS. 4A and 4B) or remote controls, this feature also aids in maintaining a secure grip. The rear section radii create the least steep concave contour and are meant to guide the portion of the finger or digit between a relevant portion of the finger and the remainder of the finger adjacent to the body. The end of the finger guide device furthest from the fingernail contains a continuation of the relatively sharp feedback ridge but is not intended to use the finger joint or skin fold under the joint as a means for positioning the fingerprint adjacent to the sensor. Instead, this relatively sharp ridge provides a tactile feedback to the user to communicate an incorrect placement of the finger and a need to reposition the finger within the recess of the finger guide device.

The sides of the finger guide device form a recess that receives the finger of the user and guides the finger laterally to center a relevant portion of the print over the fingerprint sensor 16 and drive ring 17. Accordingly, the sides of the finger guide device have the same general shape as the finger. In this first preferred embodiment of the finger guide device 12 of the present invention the sides are concave, having a varying radius of curvature. This includes a relatively short concave radius (or relatively steep slope) at the front of the finger guide device where the finger tip just below the finger nail touches or is proximal to the front of the finger guide device and a longer radius concave shape (or less steep slope) adjacent to the opposite side of the sensor where the guide extends up the finger towards the body. The sides opposite the sensor portion are quite steep to keep the finger centered laterally. Overall, the finger guide device is sized for an average finger, yet accommodates a wide range of digit sizes because it only interfaces with a small curved portion of the finger or digit. In a second preferred embodiment of the present invention (see FIG. 5), the finger guide device has a plurality of flat sides, said opposite sides being of equal slope while still practicing the present invention in this second preferred embodiment. The first preferred embodiment (FIG. 2) of the present invention of the finger guide device 12 contains a window for the sensor 16 and drive ring 17 to align and reveal them to a relevant fingerprint portion of the subject digit or finger. The AES3400 sensor or AES3500 sensor both manufactured by AuthenTec in Melbourne, Fla. would both be equally suitable as fingerprint sensors to sit in alignment with the finger guide device, as would other similar devices made by a variety of different manufacturers known to those skilled in the art of fingerprint identification and authentication systems. This window may be sufficient to contain a drive ring 17 needed for certain types of sensors (shown) or it may cover the drive ring and substitute its own electrical conductivity for that provided by a drive ring. In the preferred embodiments this may also be the case and its performance is equivalent, aesthetics being the only substantive difference. In FIG. 1 the drive ring is equivalently exposed and the finger guide device 12 is used as a supplement to the drive ring and is conductive and reflective of electromagnetic energy. This feature is desirable but not required for the finger guide device to function. Thus, in yet another preferred embodiment, the finger guide device is non-conductive yet the electrical signal provided by the drive ring is itself sufficient to illuminate the relevant minutiae portions of the fingerprint wherein the assembly functions sufficiently but not necessarily optimally.

The surface of the fingerprint sensor 16 lies on a plane with the top of the window at the bottom of the finger guide device 12; however, within reasonable limits compliance with this plane is not critical to performance as long as the subject finger can contact both the finger guide device and the example fingerprint sensor. The pliant and flexible nature of living fingers facilitates this, and while there is utility gained from an optimal match of vertical positions (planes), the invention works across a range of vertical positions. Another preferred embodiment, not shown, allows for the relative mounting planes of either the finger guide device or fingerprint sensor to be altered either by adjustment of during the authentication touching process to optimize the distance between sensor and a relevant portion of the finger minutiae tissue or the contact pressure between the fingerprint sensor and a relevant portion of the finger in order to obtain the best possible image or fingerprint data. This adjustment may be made manually or automatically using an electronic control system.

In the preferred embodiment of the present invention shown in FIG. 2, a gasket 14 is provided to keep oil, fluids, dirt, or other unwanted material away from the sensor leads and circuit board. This gasket is made of a flexible material that is impervious to solvents and other undesired contaminants. In another preferred embodiment, not shown, the gasket and its function may be replaced with conformal coating material applied in liquid form which solidifies or partially solidifies to provide a protective barrier, or equivalent seating materials known to those skilled in the art of electronic device design and assembly and thereby incorporated by reference, without diminishing the function and purpose of the present invention. The invention will also function without including a sealing gasket or equivalent seating or means of forming a protective barrier.

The finger guide device 12 of the present invention shown in FIG. 2 contains one or more mounting bosses shown in this preferred embodiment as opposite and adjacent. These are used to align the finger guide device with the sensor and its printed wiring board or other mounting means and, in turn, to mount the subassembly of fingerprint sensor, gasket, and finger guide device to a housing, counter top, appliance case or other device or system housing. The present invention works with any mounting means known to one skilled in the art of mechanical assembly and alignment of mounted parts and all such means are herein incorporated by reference. Examples include, but are not limited to adhesive mounting, welding, soldering, pinning, fastening, clamping, hooking, or locking.

The front portion of the finger guide device 12 serves as a stop and location reference designed to meet the fingertip or thumb below the nail and avoid differences in position which could result from differences in length of the subject finger or thumbnail. This is a distinct advantage over devices that clamp over or cross over the top (nail) side of the finger.

Figure 3A:
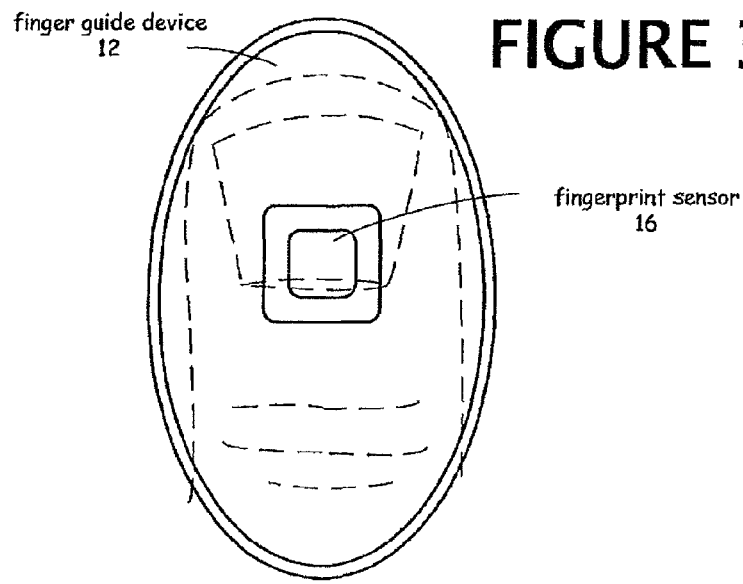
FIG. 3A discloses an overhead view of the preferred embodiment of the finger guide device of FIG. 1, with a finger mounted thereon, the finger being positioned onto the finger guide device and a relevant portion of the finger in alignment with the fingerprint sensor in order to enable matching of a relevant partial fingerprint with the matching template.
Figure 3B:
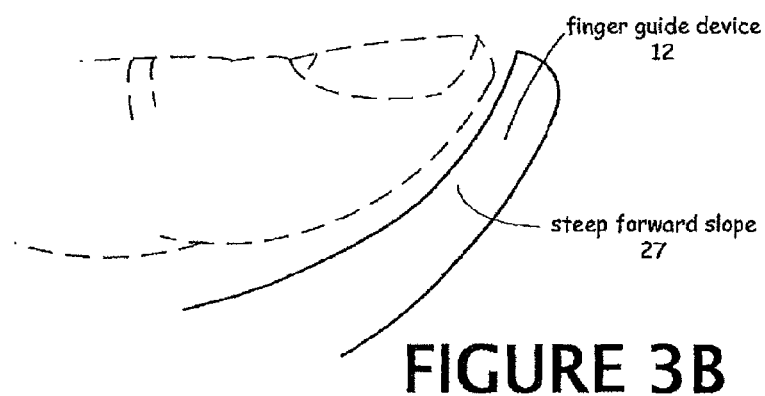
FIG. 3B discloses a side view of the steep forward slope of the finger guide device aligning the finger in axial alignment to position a relevant portion of the finger in alignment with the sensor.

FIG. 3A discloses an overhead view of the preferred embodiment of the finger guide device 12, with a finger mounted thereon, said finger being positioned onto the finger guide device so that a relevant portion of the finger is in alignment with the fingerprint sensor 16 and therefore enabling accurate matching of the relevant portion of the fingerprint; and FIG. 3B discloses a side view of the steep forward slope 27 of the finger guide device 12 aligning the finger in an axial position with a relevant portion of the finger in alignment with the fingerprint sensor and therefore enabling accurate matching of the relevant partial fingerprint portion. The top edge of the finger guide device is lower than the extension of a long fingernail so that the fingernail will not contact the finger guide device. This feature avoids the possibility of misalignment caused by differences in fingernail length that might occur between enrollment and later use of the finger guide device, either from normal fingernail growth or trimming of the fingernail during the time between enrollment and use of the finger guide device.

Figure 4B:
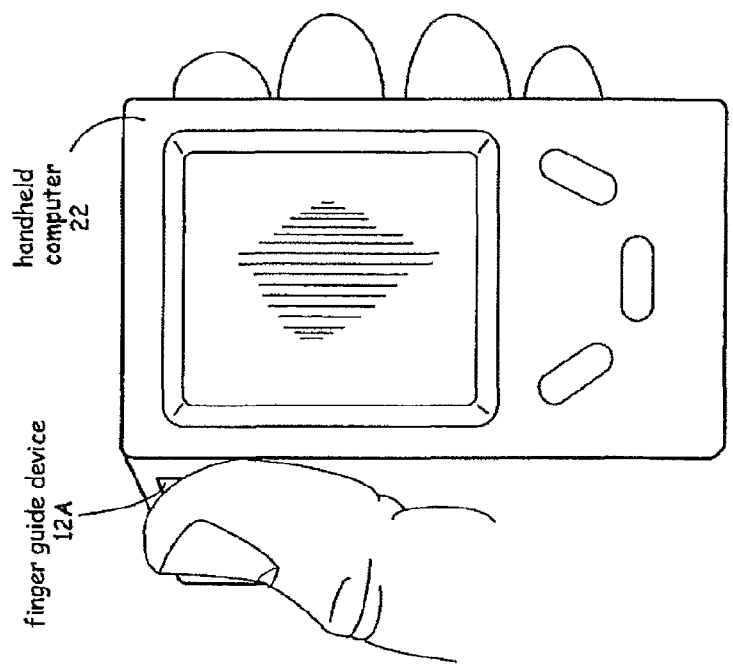
FIGS. 4A and 4B disclose another preferred embodiment of the finger guide device of the present invention mounted in the grip of a handheld computer, enabling a continuous touching and alignment of the fingerprint sensor while holding the handheld computer, and accordingly, a continuous or frequently repeating authentication or identification process; and, FIG. 5 depicts another preferred embodiment of the finger guide device, the finger guide device having flat side surfaces forming a recess for receiving a finger for placement in alignment on a fingerprint sensor, and mounted in a computer display, enabling a user to touch the finger guide device and align a relevant portion of the finger with the sensor for identification and authentication in order to gain access to data to be displayed on the computer display; and, when used to control a computer pointer, to place finger in the finger guide device to apply pressure or touch movement in axial or lateral directions or combined directions in order to use the finger guide as a pointing control device; and, if desired, while scanning or sensing a relevant portion of the fingerprint for continuous or frequently repeating authentication or identification.
Figure 4A:
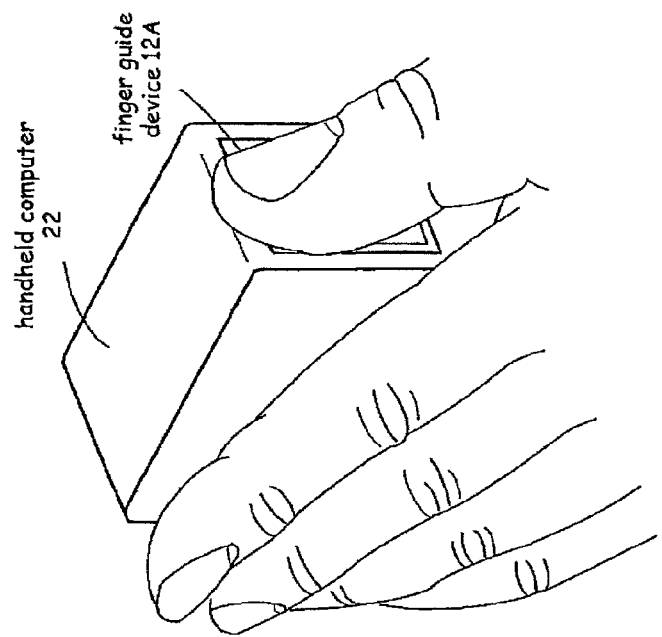

FIGS. 4A and 4B disclose another preferred embodiment of the finger guide device 12A of the present invention disposed in the grip of a handheld computer 22, enabling a continuous touching of the fingerprint sensor; and accordingly, a continuous authentication or identification. Certain devices may be made more secure by requiring continuous or frequently repeating authentication of users. This avoids the security risk of having one authorized person touch the finger guide device and fingerprint sensor to access the system or turn on the device and then pass or release the device to an unauthorized user in a security breach process known as "tailgating." Tailgating may be avoided by mounting the finger guide device 12A, wherein the finger guide device 12A having flat side surfaces with each pair of opposite sides having roughly equal slope, and said combination of sides forming a recess for non-forcible receiving of a finger for placement in alignment on a fingerprint sensor in a handheld computer 22 as shown in FIGS. 4A and 4B in a manner compatible with normal grasping and holding of the handheld device so that continuous or frequent authentication can be conveniently achieved without changing the grip on the device or diverting away from other data input activities during repeat authentication of the user.

Figure 5:
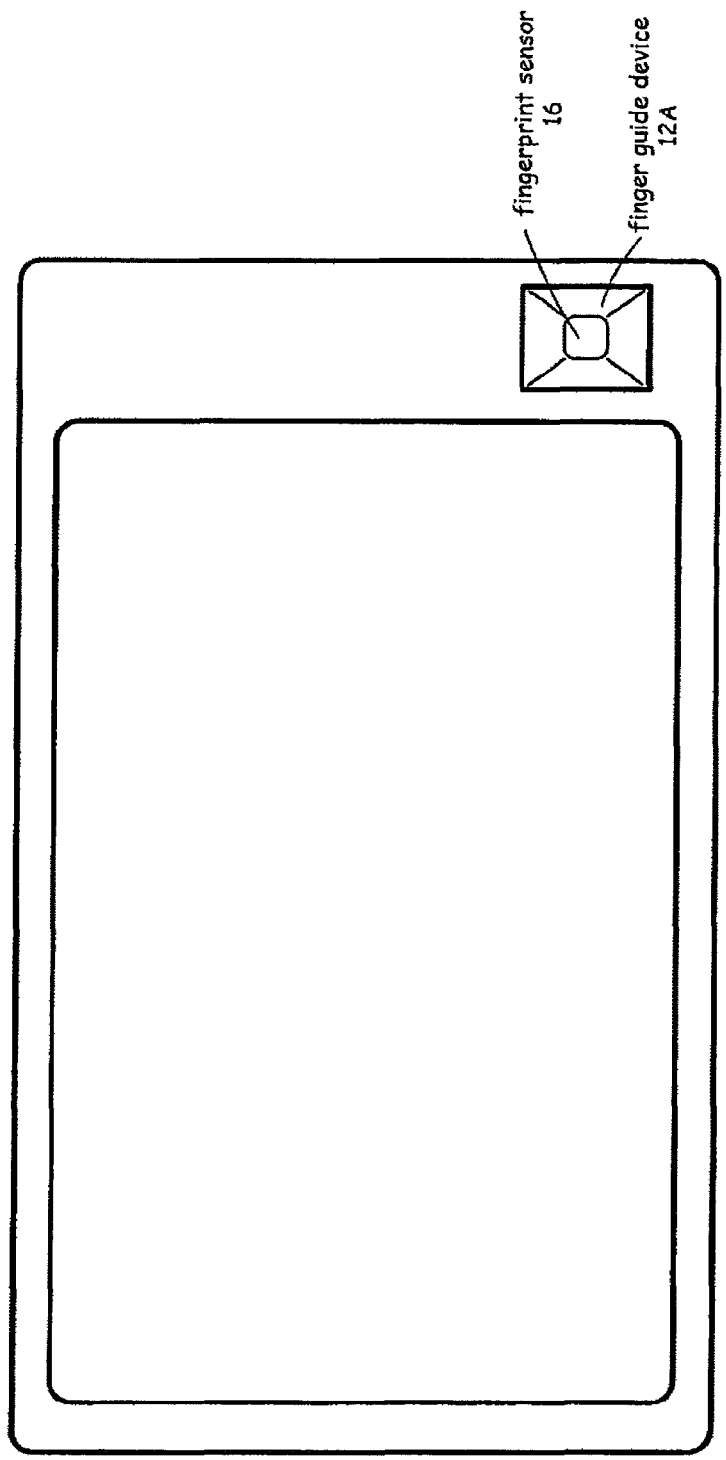

FIG. 5 depicts another preferred embodiment of the finger guide device 12A, wherein the finger guide device 12A having flat side surfaces with each pair of opposite sides having roughly equal slope, and said combination of sides forming a recess for non-forcible receiving of a finger for placement in alignment on a fingerprint sensor 16; and, in this application example FIG. 5, mounted in the housing of a computer display, enabling a user to touch the finger guide device 12 and align a relevant portion of the finger with the sensor in a reasonably repeatable position for identification and authentication in order to gain access to data to be displayed on the computer display; and, to also be used to control a computer pointer through the application of additional pressure to the finger guide device 12A, said pressure communicated to one or more pressure sensing means in mechanical communication with the finger guide device. Another similar preferred embodiment would include touch and location sensitive material to the inner surfaces of the finger guide device to facilitate use as a pointing control device, such material known to those skilled in the state of the art of design of computer pointing control devices and herein incorporated by reference.

As a substitute for a computer mouse point device, the finger guide device of this preferred embodiment of FIG. 5 permits a subject user to place his finger in the finger guide device to apply pressure in axial or lateral directions or combined directions in order to use the finger guide as a pointing control device; and, if desired, to do so while authenticating or identifying himself to the system. Another similar preferred embodiment would include mounting the finger guide device in mechanical communication with one or more electromechanical switches or equivalent switching means to permit the finger guide device 12 to serve as a component of a pressure activated single switch, a three way rocker switch, or a nine way bilateral rocker switch wherein the subject user is authenticated just before or during the switching process.

In any of the various preferred embodiments described herein, additional bumps may be added to the finger guide device 12 or 12A to help further orient the subject finger or enable subjects to "fine tune" their finger position. These may be unnecessary for normal or average sized fingers but may be worthwhile in applications where the subjects have very small fingers that contact relatively little of the finger guide device surface area. Braille may be added to the finger guide device for assisting blind or visually impaired users.

The finger guide devices of the present invention in any of its various preferred embodiments described herein may also use physical elements and specific material properties to discourage improper use. For example, the preferred method of practicing this invention shown in FIG. 1 surrounds the finger guide device 12 with a relatively hard and distinct ridge. While not felt as dangerously "sharp" this ridge is intended to be felt as uncomfortable. When a finger is placed across this ridge, while not harmful, it is not comfortable because it applies a high pressure per square inch (PSI) to the skin across a very narrow area. This high pressure per square inch signals through the sense of touch that the finger is not being positioned correctly in the recessed area. The feel of the misaligned finger is meant to feel unnatural and the user will instinctively reposition his finger to find a more comfortable feel. The natural tendency is to avoid placing the finger against the outer ridge of the finger guide device, instead easily sliding the finger or thumb down comfortably and non-forcibly into the finger guide device and onto the sensor (the desired position).

The material property of high thermal conductivity may be used to cause any of the preferred embodiments of the finger guide devices disclosed herein to feel colder to the touch than the surrounding surfaces and the sensor surface. Although all surfaces are normally at the same temperature, the ability to draw heat from the skin (thermal conductivity) creates the feeling that something is cold. For example, by stipulating a finger guide device (or surface coating) made of metal (or other thermally conductive material such as ceramic or nanoparticle ceramic paint), any of the preferred embodiments will have this property of feeling colder than the surrounding surfaces provided that the surrounding surfaces are of a material with a lower thermal conductivity, such as plastic or cloth. The result is the subject user's tactile feedback based ability to distinguish the finger guide device surfaces from other surfaces and thereby guide his finger onto the finger guide device.

A smooth inner surface is also important to any of the preferred embodiments of the finger guide devices disclosed herein. A low coefficient of sliding friction permits the subject finger to slide downward into the recession in a non-forcible manner until it reaches a stable global minimum which corresponds by design with a finger position in reasonably repeatable fingerprint sensor alignment with a relevant portion of the finger. A low coefficient of static friction allows the subject finger to begin its sliding into position in a non-forcible manner and also prevents the subject finger from stopping part way into the recession at a local minimum rather than the desired and most stable global minimum which corresponds, by design, with a final finger position in reasonably repeatable fingerprint sensor alignment with a relevant portion of the finger. The lower the coefficients of friction, the better the preferred embodiments will work; such acceptable coefficients of friction being available through the surface properties of materials like, but not limited to, polished metals, polished plastics, plated metals like chromium, surface waxes, lubricants, or special paints or coatings. Examples of materials which may be applied after cleaning of the finger guide device, or formulated in cleaning wipes for application during cleaning, include but are not limited to wet and dry lubricants (e.g.— lubricants such as those used as bottle lubricants by bottling plants) and fatty acid based static suppressants like Jojoba oil.

Any of the preferred embodiments of the finger guide devices disclosed herein may be designed to work with active feedback mechanisms including those designed to alert subjects or to train subjects regarding the correct positioning of their finger or with other feedback means designed to alert subjects to the fact that they have been accepted into the system (which is to say that their fingerprint has been scanned, compared, and correctly matched). Sound or voice commands may be used to instruct users how to "guide" the finger into proper alignment with the sensor. Active or passive visual indicators may also be used with any of the preferred embodiments of the finger guide devices disclosed herein. Examples include but are not limited to light indicators, icons, fingerprint drawings or markings, indicia markings, text instructions, or colored markings, wherein such indicators are known to those skilled in the art of human factors engineering and are herein incorporated by reference.

Finally, physical movement used as a mechanical movement feedback mechanism such as vibration or "click" may be applied much like the stick shaker that alerts pilots of a stall warning when flying a plane, such mechanical movement feedback means being known to those skilled in the art of human factors engineering.

These feedback mechanisms may also be used to correct misuse of the system in any of the preferred embodiments of the finger guide devices disclosed herein. For example, extreme pressure on the sensor or a lack of touch pressure can cause scanning problems. Overpressure can flatten minutiae and saturate the sensor and cause inability to resolve minutiae accurately. Conversely, the lack of pressure in the form of too light a touch may cause the minutiae to remain irresolvable by the sensor and a good image cannot be generated. In either case, a voice command or sound or other feedback means as described above could be used to communicate the need to relax the pressure (or grip) or even to press (or squeeze) a bit harder. An indicator light, vibration, or other feedback means as described above or known to those skilled in the art of human systems engineering and herein incorporated by reference may communicate to the subject the need to lighten up touch pressure or lift the finger a bit.

Another viable approach is to move the sensor up or down slightly in the finger guide device sensor area. Although the preferred embodiments of the finger guide devices 12 and 12A do not disclose the ability to adjust the depth of the sensor relative to the plane of the bottom of the recess, additional preferred embodiments permit this and this element may be incorporated in any of the preferred embodiments of the finger guide devices disclosed herein. One such preferred embodiment of the finger guide device permits manual adjustment of the level of the sensor to modify for finger contact pressure in order to optimize the image or image data properties. Yet another preferred embodiment of the finger guide device is in communication with the system computer to make a real time determination of the need to move the sensor in closer or further proximity to the plane at the bottom of the recess and thereby in closer or further proximity to a relevant portion of the finger or living minutiae tissue, and thereby resulting in a real time optimization of the image of a relevant portion of the fingerprint, regardless of whether or not pressure is the determining factor in image optimization. For example, if an optical sensor is used, then the disclosed real time adjustment may be related to focal length rather than contact pressure; or, if a sensor detecting sub-surface tissue properties is used, then the pressure against the finger causing reduced blood circulation may require adjustment.

A user subject may be under duress or in peril during use of the finger guide device of the present invention; for example, a crime might be underway wherein a subject might be at gunpoint and forced to authenticate against his will. In such a circumstance, it may be desirable for the user to have a different digit enrolled as an emergency signal that the device user is in danger, said emergency digit selection not necessarily being known to others. If the user is experiencing another type of emergency, or forced illegally to use the device as previously described, then he may use his "911" digit to call for emergency assistance. In such a case, the system cannot match the enrolled fingerprint, but it will recognize a match with the user subject's emergency finger and therefore recognize the user's instruction need to respond differently and accordingly. In one possible embodiment of the finger guide device of the present invention, this emergency digit match is taken as an instruction to trigger so-called "silent alarms" to provide immediate aid (e.g. police assistance). In addition, the system, rather than reject the user subject, could be programmed to appear to malfunction, or for other revealed reason than subject's failure to authenticate, be rendered unable to complete the desired security controlled event or otherwise delay the event to allow extra time for assistance to arrive, such approach intended to minimize the risk to the subject under duress.

For any of the preferred embodiments of the finger guide devices disclosed herein, a preferred method of practice for this invention is within an assembly with the sensor and finger guide device designed and aligned to work together as one unit, which is to say in a complete system. This requires configuring the sensor for operation on a circuit board, likely containing additional support circuitry for its application with said sensor in communication with said support circuitry. The combination of finger guide device, sensor, sealing gasket (or an equivalent or otherwise no protective barrier means), and printed wiring board may or may not be placed in its own discrete housing. This subassembly may be placed in a variety of devices or products for use. The system unit disclosed is a security system platform device having a plurality of applications in products or other more complex systems. Examples include vehicle doors or dashboards, countertops, doorframes or doors, keyboards, personal digital assistants, telephonic devices, secure fax machines, computing devices, displays, appliances, instruments, machinery controls, medical devices, cash registers, and much more.

Throughout this specification, there are various patent/ applications that are referenced by application number and inventor. The disclosures of these patents/applications are hereby incorporated by reference in their entireties into this specification in order to more fully describe the state-of-the-art. In order to maintain a reasonable length of disclosure, additional elements using common means known to those skilled in various arts are also incorporated by reference and such means and are not included herein. Any of the preferred embodiments of the finger guide devices disclosed herein may use future means to facilitate disclosed elements, such means not being reasonably anticipated by the inventor at this time, but being herein incorporated by reference.

It is evident that many alternatives, modifications, and variations of the finger guide devices 12 and 12A and any others disclosed herein of the present invention will be apparent to those skilled in the art in light of the disclosure herein. It is intended that the metes and bounds of the present invention be determined by the appended claims rather than by the language of the above specification, and that all such alternatives, modifications, and variations which form a conjointly cooperative equivalent are intended to be included within the spirit and scope of these claims.

What is claimed is:

1. A finger guide device for identity authentication and confirmation, the finger guide device comprising:
   a finger guide having side surfaces that form a recess, the recess being funnel shaped with a circular, oval, square, or rectangular mouth to receive a fingertip so that in use, the finger is guided into position at a base of the recess; and
   a capacitive fingerprint scanner aligned within the recess of the finger guide; whereby the finger guide device positions the finger onto the fingerprint scanner, the finger guide device enabling a relevant portion of the finger to rest in a stable position in alignment with the fingerprint scanner each time a fingerprint is to be read,
   wherein a surface of the finger guide device includes a drive ring to provide an electrical signal to illuminate partial portions of the fingerprint and
   wherein the finger guide device is configured to be utilized as a pointing control device by placing the finger in the finger guide device to apply a touch gesture selected from at least one direction: axial direction, lateral direction, and combinations thereof.

2. The finger guide device as claimed in claim 1, whereby the finger guide device positions the finger onto the fingerprint scanner, and provides a tactile feedback mechanism to communicate to a user an incorrect placement of the finger and a need to reposition the finger within the recess of the finger guide device.

3. The finger guide device as claimed in claim 1, wherein the surface of the finger guide device has a higher thermal conductivity than surrounding surfaces so that heat is conducted away from a user's skin rapidly, wherein the material is selected from at least one of: metal, metal plated surface, ceramic, carbon based material, and combinations thereof.

4. The finger guide device as claimed in claim 1, further comprising a plurality of bumps to enable auto correction of the finger orientation.

* * * * *